United States Patent
Miller

(10) Patent No.: US 11,275,867 B1
(45) Date of Patent: Mar. 15, 2022

(54) CONTENT INTEGRITY PROCESSING

(71) Applicant: Amazon Technologies, Inc., Seattle, WA (US)

(72) Inventor: Jonathan Matthew Miller, Burke, VA (US)

(73) Assignee: Amazon Technologies, Inc., Seattle, WA (US)

( * ) Notice: Subject to any disclaimer, the term of this patent is extended or adjusted under 35 U.S.C. 154(b) by 372 days.

(21) Appl. No.: 15/908,535

(22) Filed: Feb. 28, 2018

(51) Int. Cl.
*G06F 21/64* (2013.01)
*H04L 29/06* (2006.01)

(52) U.S. Cl.
CPC .......... *G06F 21/64* (2013.01); *H04L 63/0428* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 6,131,162 | A * | 10/2000 | Yoshiura | G06T 1/0021 713/176 |
| 7,360,092 | B1 * | 4/2008 | Peterson | H04L 9/3226 713/150 |
| 7,526,733 | B1 * | 4/2009 | Samson | G06F 21/16 715/764 |
| 7,996,530 | B1 * | 8/2011 | Hogeboom | H04L 63/123 709/219 |
| 8,379,911 | B2 | 2/2013 | Vashistha | |
| 8,943,320 | B2 * | 1/2015 | Sabin | H04L 63/10 713/171 |
| 9,679,190 | B2 * | 6/2017 | Bartlett, II | H04L 63/126 |
| 9,703,971 | B2 * | 7/2017 | Hu | G06F 16/9566 |
| 10,114,999 | B1 * | 10/2018 | Burke | G06K 7/10732 |
| 2003/0084294 | A1 * | 5/2003 | Aoshima | H04L 9/3247 713/169 |
| 2003/0229810 | A1 * | 12/2003 | Bango | H04L 63/145 726/24 |
| 2005/0125301 | A1 * | 6/2005 | Muni | G06Q 30/06 705/23 |
| 2006/0011728 | A1 * | 1/2006 | Frantz | G06Q 30/02 235/462.46 |
| 2010/0115594 | A1 * | 5/2010 | Paya | H04L 9/3271 726/5 |

(Continued)

FOREIGN PATENT DOCUMENTS

WO  WO-2014127823 A1 *  8/2014 ......... H04N 1/32304

OTHER PUBLICATIONS

Kyeongwon Choi, Changbin Lee, Woongryul Jeon, Kwangwoo Lee and Dongho Won, "A mobile based anti-phishing authentication scheme using QR code," International Conference on Mobile IT Convergence, Gyeongsangbuk-do, 2011, pp. 109-113.*

*Primary Examiner* — Jeffrey Nickerson
*Assistant Examiner* — Vadim Savenkov
(74) *Attorney, Agent, or Firm* — Knobbe, Martens, Olson & Bear, LLP

(57) ABSTRACT

Generally described, one or more aspects of the present application correspond to a content validation system. A content validation service receives visual secret request information from user devices. The content validation service provides visual secret information to be rendered with received content. The content validation service then receives a snapshot of content to be rendered including a representation of the visual secret information to validate the content.

20 Claims, 9 Drawing Sheets

(56) References Cited

U.S. PATENT DOCUMENTS

| | | | |
|---|---|---|---|
| 2010/0205291 A1* | 8/2010 | Baldry | G06F 15/173 709/224 |
| 2011/0314550 A1* | 12/2011 | Mastrangelo | H04N 1/32309 726/26 |
| 2012/0072731 A1* | 3/2012 | Winograd | G09C 5/00 713/176 |
| 2012/0136698 A1* | 5/2012 | Kent | G06Q 20/387 705/14.1 |
| 2012/0209749 A1* | 8/2012 | Hammad | G06Q 20/3674 705/27.1 |
| 2013/0111208 A1* | 5/2013 | Sabin | H04L 63/0884 713/171 |
| 2013/0124415 A1* | 5/2013 | Mardikar | G06Q 20/40 705/44 |
| 2014/0075287 A1* | 3/2014 | Scoda | G06F 40/14 715/234 |
| 2014/0123261 A1* | 5/2014 | Blair | H04L 51/00 726/7 |
| 2015/0334108 A1* | 11/2015 | Khalil | H04L 63/10 726/8 |
| 2015/0371613 A1 | 12/2015 | Patel | |
| 2016/0098578 A1* | 4/2016 | Hincker | H04W 12/10 726/26 |
| 2016/0117061 A1* | 4/2016 | Hodgart | G06T 1/0007 715/733 |
| 2016/0162875 A1* | 6/2016 | DeSoto | H04L 63/08 705/21 |
| 2017/0053105 A1* | 2/2017 | Curzi | H04L 63/08 |
| 2017/0286544 A1* | 10/2017 | Hunt | H04L 63/0876 |
| 2018/0026790 A1* | 1/2018 | Seo | H04L 63/12 713/181 |
| 2019/0087927 A1* | 3/2019 | Dewitt | G06T 1/0035 |
| 2019/0268373 A1* | 8/2019 | Celik | G06K 9/00483 |

\* cited by examiner

CONTENT INTEGRITY PROCESSING

BACKGROUND

Generally described, computing devices and communication networks can be utilized to exchange information. In a common application, a computing device can request content from another computing device via the communication network. For example, a user at a personal computing device can utilize a browser application to request a content page (e.g., a network page, a Web page, etc.) from a server computing device via a network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
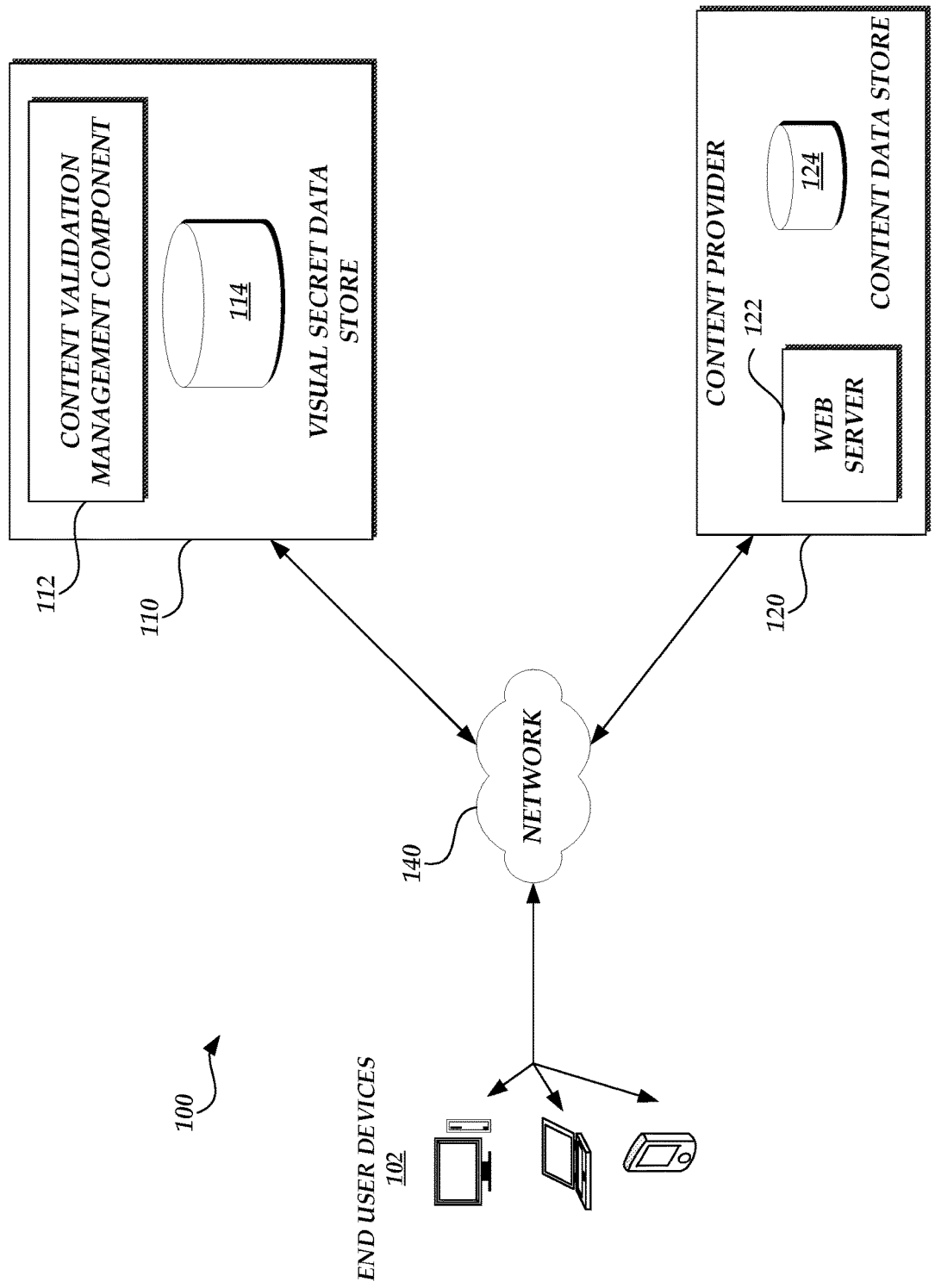
FIG. 1 is a block diagram of an illustrative operating environment in which one or more user devices communicate with a content validation service via a communication network.

Generally described, content providers can provide content to requesting users. With regard to network-based content, a content provider can offer content to user devices that is requested in accordance with one of a range of communication protocols, such as the hypertext transfer protocol ("HTTP"). By way of illustrative example, a user operating a user device may input a domain name in a browser application to access a content page or to otherwise retrieve content from an identified content provider. In order to identify a network address (e.g., Internet protocol (IP) address) corresponding to the domain name, the browser application may submit a domain name service ("DNS") query. Illustratively, the DNS request is resolved by returning an IP address of a server computing device maintained by the identified content provider. Based on resolving the DNS query, the browser application can then issue HTTP-based requests to IP addresses requesting the content (e.g., a Web page), which itself can include references to one or more embedded resources that are also requested in a manner described above.

In some embodiments, a third party may provide content to user devices in manner that the user of the user device believes they are accessing content generated by the content provider. Such embodiments can be generally referred to as spoofing or phishing and typically result in a user interacting with copied or manipulated content to make available personal information, such as user identifiers, passwords, financial information or other personal information. Such third parties can utilize various social engineering approaches or methodologies to cause a user to believe they are requesting content from or accessing a content provider. By way of illustrative example, a third party may maintain one or more domain names that correspond to common misspellings, abbreviations, or alternative tradenames of a content provider. In another example, a third party can generate communications, such as electronic mails, text messages, etc. that purport to be from the content provider requesting the user access their account by accessing a targeted link included in the communication.

With continued reference to the illustrative examples, once a third party has caused a user to access a link provided by the third party or once a user otherwise believes that an accessed domain name (e.g., the commonly misspelled domain name) is associated with a content provider, in one approach, the third party can provide the user computer browser executable code, such as HTML code and references, that closely resembles or is copied from the content provider. The third party can include additional code or manipulate the copied code such that the third party can access personal information, such as capturing information included in a logon-screen or creating additional interfaces requesting confirmation of financial information, passwords, etc. Additionally, third parties can attempt to keep such activities more secret by redirecting the use to the legitimate content provider web page or interface once personal information has been captured. For example, a third party can generate a fraudulent user logon page to capture personal information. Once the personal information is captured, the third party can simply redirected the browser computer to the legitimate user logon page, which may ask the user to provide the personal information again. The user may unfortunately not recognize the first interaction as fraudulent, which allows the third party to access or utilized the captured information without intervention by the user (e.g., immediately changing a password or cancelling a credit card).

Generally described, one or more aspects of the present application correspond to a content validation service that validates or facilitates validation of one or more aspects of content provided to user devices. More specifically, one or more content providers can register with a service provider, such as a content validation service to validate or check the integrity of content generated by or generated on behalf of the content provider. In addition to registering with content providers, the content validation service transmits, or otherwise makes available, executable code in the form of content validation processing code that can be executed on user devices in conjunction with the content provided, or made available, by the content provider. Once received and processed by user devices, the content validation processing code can illustratively cause user devices to request visual secret information or validation information from the content validation service. The user devices can be further configured to analyze validation information provided by the content validation service. Additionally, once visual secret information has been provided, the content validation processing code can further cause the user computers to generate and transmit a snapshot of rendered content that includes any received visual secret information and additional integrity information related to the received content.

Illustratively, the content validation service can first receive and process user computer requests for visual secret information responsive to the execution of the content validation processing code provided from the content provider. Accordingly, in one aspect of the present disclosure, the content validation service can attempt to determine whether the user device requesting the visual secret information corresponds to a device or software application that also request the initial content (e.g., the based HTML) from the content provider. If the user device cannot be matched to a previous request for content, the content validation service can make a determination or characterization that the user device has received the initial content from a third-party source and not the content provider. Based on such a determination and characterization, the content validation service may attempt to generate a notification or otherwise cause the identification of content as potentially compromised.

In addition to validating the source of the initial content requests, in another aspect, the content validation service can utilize integrity information to make a determination or characterization of whether the initial content transmitted received by the user device may be considered to be compromised in some manner. In one example, the user device request can include integrity information, such as hashing information or checksum information, calculated by the user device, through a content validation component, and transmitted to the content validation service. The content validation service can maintain reference integrity information provided by the content provider, or on behalf of the content provider, based on the intended version of the initial content. If the content validation service cannot match the received integrity information with the reference integrity information, the content validation service can make the determination or characterization that the initial content received by the user device has been modified. Based on such a determination and characterization, the content validation service may attempt to generate a notification or otherwise cause the identification of content as potentially compromised.

In another aspect, in addition to or in lieu of the content validation service making the determination or characterization that the initial content received by the user device has been modified, the content validation service can transmit the reference integrity information to a user device requesting the visual secret information. In this aspect, the content validation component being executed on the user device can facilitate capturing the integrity information of the received initial content (as described above) and comparing the integrity information with the received reference integrity information. Based on such a determination and characterization, the content validation processing component may attempt to generate a notification or otherwise cause the identification of content as potentially compromised.

In addition to processing the visual secret information request as described in various embodiments above, the content validation service can obtain or generate visual secret information, which is transmitted to the requesting user device. Illustratively, the visual secret information received by the user devices is processed to be rendered in conjunction with other content received by the user device. By way of example, the visual secret information can be embodied and rendered on user device as bar codes, QR codes, color sequences, fonts, text size, or other visual manipulations in which unique identifier information in the visual secret information can be interpreted to visual form. Accordingly, the content validation processing code can cause the browser application (or other software application) to generate a visual image of the combination of the rendered content received by the user device and the visual secret information. Additionally, the content validation processing code can also cause the user device to generate or obtain integrity information related to the subsequently processed received content, such as checksum information or hashing information. The content validation processing code can then cause the user device to transmit the visual image (e.g., snapshot) and calculated integrity information to the content validation service.

In addition to processing and assessing requests for visual secret information (as discussed above), the content validation service can also receive and process the snapshot information and additional integrity information. In one aspect, the content validation service can utilize the integrity information to make a determination or characterization of whether the content transmitted by the content provider has been modified or supplemented prior to receipt by the user device. Similar to the previously discussed example, the user device transmits integrity information about the processed content information, such as hashing information or checksum information, calculated by the user device, through a content validation component, and transmitted to the content validation service. The content validation service can maintain reference integrity information provided by the content provider, or on behalf of the content provider, based on the intended version of the processed content. Illustratively, if hashing information transmitted by the user device does not match hashing information generated by the content as provided by the content provider, the content validation service can make the determination that the processed content has been modified.

Additionally, the content validation service can process the submitted visual image to extract the rendered visual image (e.g., identifying the identification information represented in the visual form, such as bar code information). Based on the extracted rendered visual image, the content validation service can then determine whether the visual secret information matches or substantially matches the visual secret information provided to the user device and whether the visual secret information remains valid. For example, if visual secret information provided by the snapshot may have expired or is otherwise modified, the content validation service can make the determination that the content has been modified. Based on such additional determinations and characterizations, the content validation service may attempt to generate a notification or otherwise cause the identification of content as potentially compromised FIG. 1 is a block diagram of an illustrative operating environment 100 in which one or more user devices 102 communicate with a content validation service 110 via a network 140. The operating environment 100 also includes a number of content providers 120 for providing content to the content validation service 110.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The user devices 102 may execute an application (e.g., a browser, a media player, etc.) that generates and transmits content requests.

The content validation service 110 includes a content validation management component 112 for processing and managing validation configurations from the content providers 120, obtaining requests from user devices 102 for visual secret information and for validating visual secret snapshot information and providing or causing some form of mitigation technique in the event in certain scenarios. Illustratively, the content validation service 110 can be implemented in a manner such that requests from user devices, via a network application or browser application, can be processed and if content is determined to have been likely modified or otherwise no longer valid, the content validation service 110 can identify potential problems with received content or otherwise limit user interaction with received content to avoid release of personal information. To support the operation of the content validation content validation service 110, the content validation service 110 can include a content validation store 114 for maintain information utilized by the content validation service 110 to make one or more characterizations of received content or interactions with the user devices as described herein.

As illustrated in FIG. 1, the content provider 120 can include a web server 122 for transmitting the underlying content, such as HTML pages and embedded resources. The content provider 120 can also include a data store 124 representative of the underlying embedded content and personalization information from users. One skilled in the relevant art will appreciate that a content provider 120 would include a number of additional components or processing components to interface with the content validation service 110 and user devices 102. Additionally, although a single content provider 120 is illustrated, the operating environment 100 can include a number of content providers 120.

The network 140 may include any wired network, wireless network, or combination thereof. For example, the network 140 may be a personal area network, local area network, wide area network, over-the-air broadcast network (e.g., for radio or television), cable network, satellite network, cellular telephone network, or combination thereof. As a further example, the network 140 may be a publicly accessible network of linked networks, possibly operated by various distinct parties, such as the Internet. In some embodiments, the network 140 may be a semi-private or private network, such as a corporate or university intranet. The network 140 may include one or more wireless networks, such as a Global System for Mobile Communications (GSM) network, a Code Division Multiple Access (CDMA) network, a Long Term Evolution (LTE) network, or any other type of wireless network. The network 140 can use protocols and components for communicating via the Internet or any of the other aforementioned types of networks.

For example, the protocols used by the network 140 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 2:
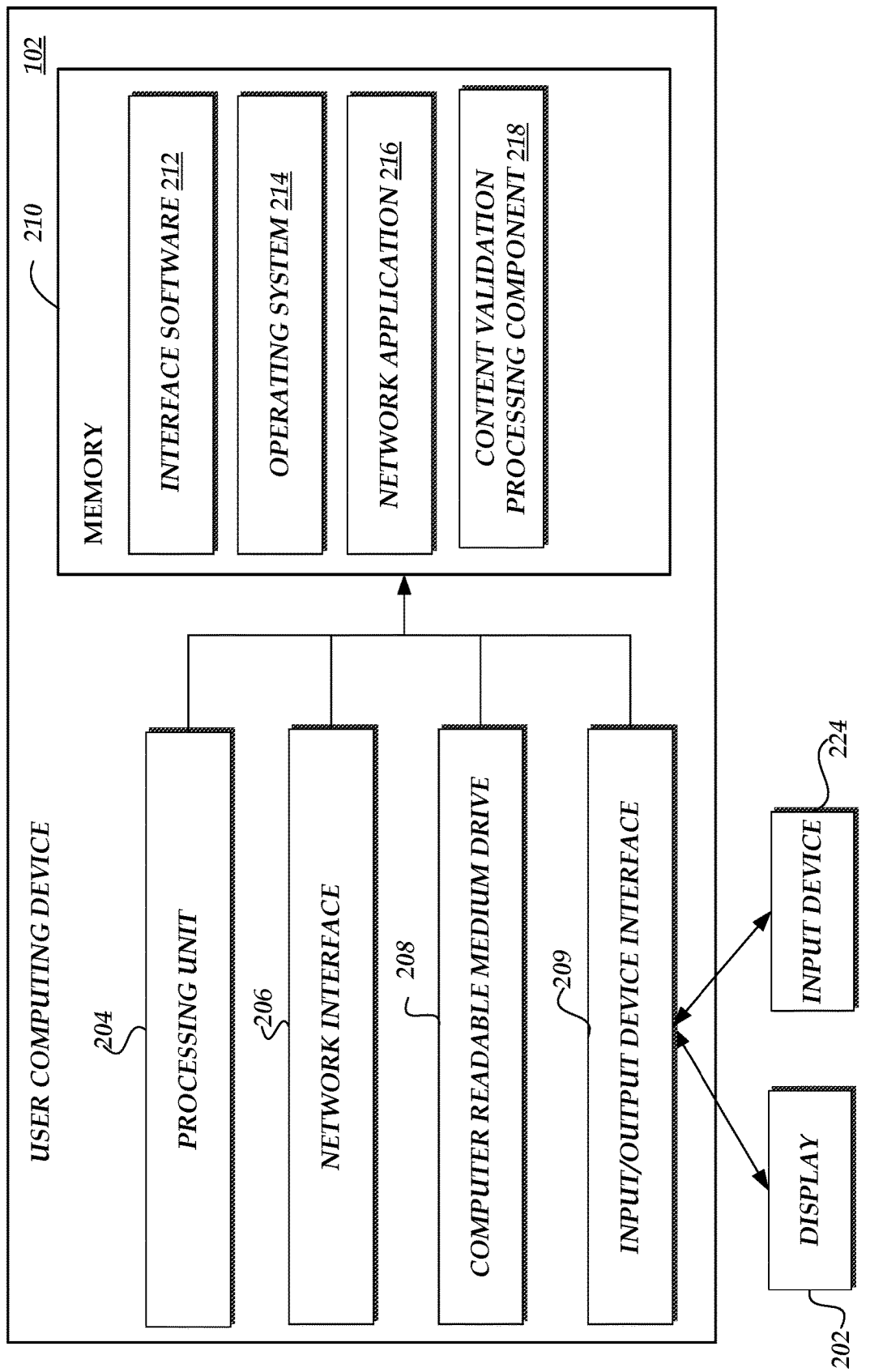
FIG. 2 is a block diagram of illustrative components of a user computing device configured to request content and receive processed content in accordance with illustrative embodiments.

FIG. 2 depicts one embodiment of an architecture of an illustrative user computing device 102, such as a personal computer, tablet computer, smartphone, or other device, that can generate content requests and process content requests in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, a computer readable medium drive 208, an input/output device interface 209, an optional display 202, and an input device 224, all of which may communicate with one another by way of a communication bus. In various embodiments, components such as the display 202 and/or the input device 224 may be integrated into the user computing device 102, or they may be external components that are coupled to the device 102.

The network interface 206 may provide connectivity to one or more networks or computing systems, such as the network 140 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes a network application 216, such as browser application or media player, for requesting and accessing content from content providers 120. The memory 210 may include further include a content validation processing component 218 that corresponds to executable code provided by, or on behalf, of the content validation service 110 to facilitate various aspects of content validation. For example, the content validation processing component 218 can include executable code that facilitates the generation of visual secret information requests, the generation of content integrity information, the processing of content integrity information with reference information, and the processing of notifications or alerts characterizing the integrity of received content. Although the content validation processing component 218 is illustrated as a separate application, the content validation processing component 218 may be integrated as part of the network application 216 or otherwise interrelated with the network application 216.

Figure 3:
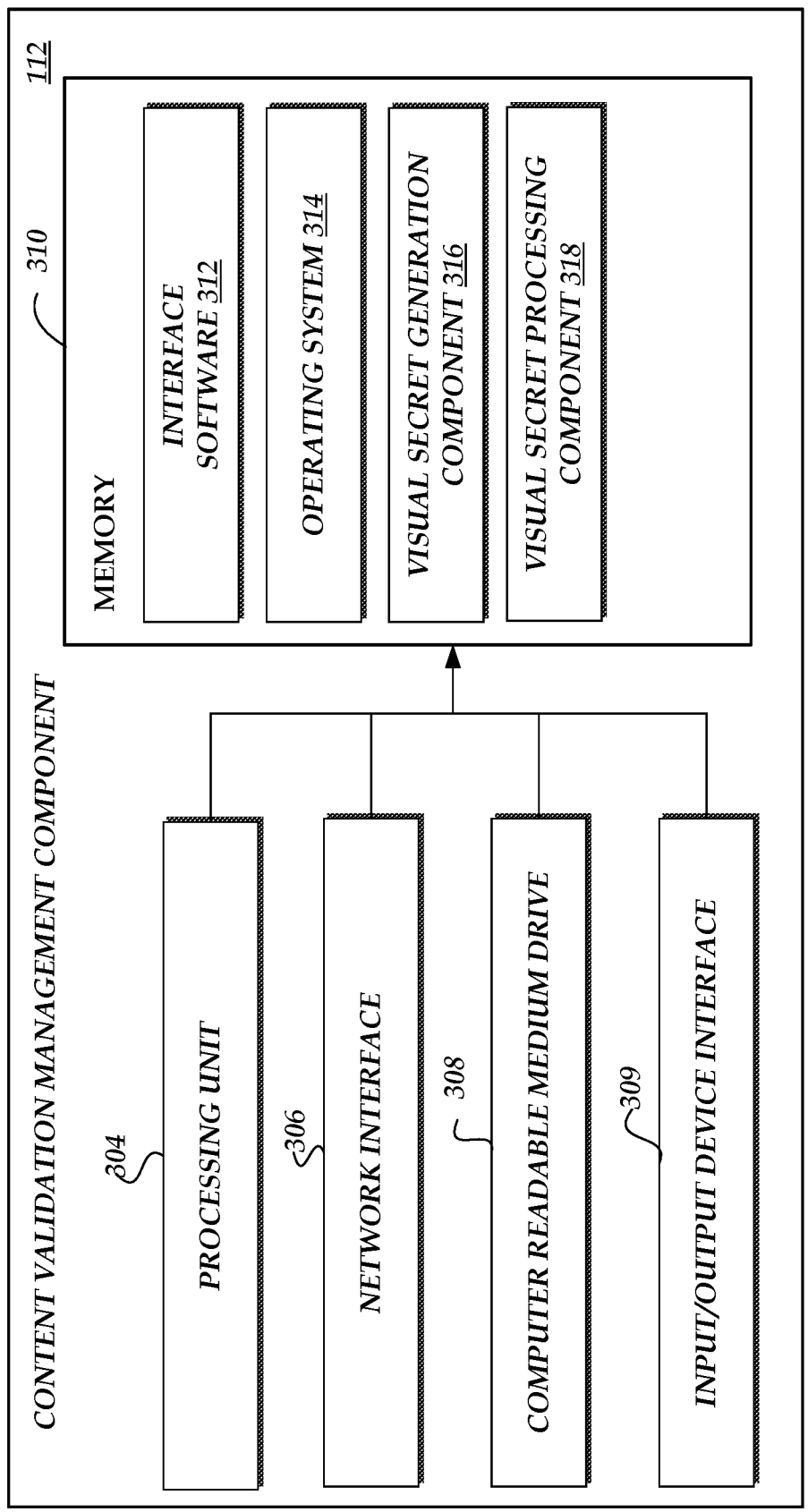
FIG. 3 is a block diagram of illustrative components of a content validation service configured to validate requests for content for delivery to user devices in accordance with illustrative embodiments.

FIG. 3 depicts one embodiment of an architecture of an illustrative server for implementing the content validation management component 112 of the content validation system 110 described herein. The general architecture of the content validation management component 112 depicted in FIG. 3 includes an arrangement of computer hardware and software components that may be used to implement aspects of the present disclosure. As illustrated, the content validation management component 112 includes a processing unit 304, a network interface 306, a computer readable medium drive 308, and an input/output device interface 309, all of which may communicate with one another by way of a communication bus. The components of the content validation management component 112 may be physical hardware components or implemented in a virtualized environment.

The network interface 306 may provide connectivity to one or more networks or computing systems, such as the network 140 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the content validation management component 112 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving visual secret and content validation requests from user devices 102. To facilitate the processing of the requests, the memory 310 includes a visual secret generation component 316 for processing request for visual secret information from user devices 102 and making determinations regarding such visual secret requests as described herein. The memory 310 further includes a visual secret processing component 318 for processing visual secret snapshot information provided by user devices 102 and making determinations regarding such visual secret snapshot information as described herein.

Figure 4A:
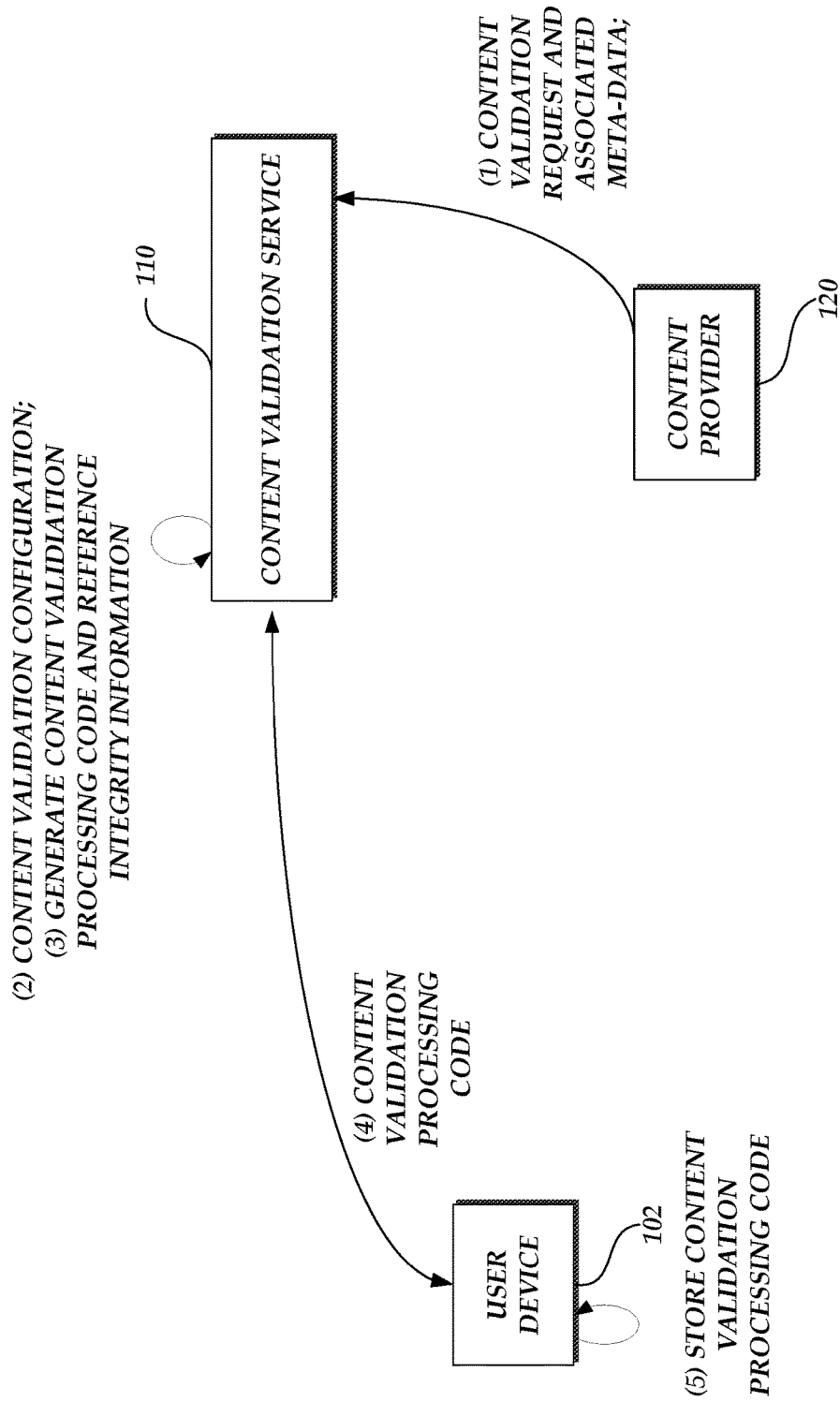
FIGS. 4A-4D are block diagrams of the operating environment of FIG. 1 illustrating the interaction related to a user device generating content requests and a content validation service processing requests for validating content request from the user device.

Turning now to FIGS. 4A-4D, an illustrative interaction for the processing and validation of the integrity of content requests will be described. Turning to FIG. 4A, the registration of the content provider 120 with the content validation service 110 and the provisioning of the content validation code on user devices 102 will be described. At (1), the content provider 120 transmits a request to the content validation service 110 to provide content validation services. Illustratively, the content validation service 110 will be configured to receive visual secret requests from the user devices 102 based on content purported to have been provided by the content provider 120. For example, a user request for a web page associated purported to be provided a content provider domain.

The request can also in some embodiments include meta-data or other processing information that can specify information related to the content provided by content provider 120. By way of illustrative example, the meta-data can specify the reference integrity information of the content provided by the content provider 120, such as checksums, hashing, or other identification information. Additionally, the meta-data can include copies of the initial content that can be utilized by the content validation service 110 to generate the reference integrity information. The meta-data can also specify specific notifications or mitigation techniques that are to be implemented by the content validation service 110. Still further, the meta-data can include configuration information that can specify a desired frequency for user devices to validate content. For example, if the content provider 120 provides content including financial information or confidential information, the content provider 120 can specify a desired frequency level (e.g., every request for content) or other evaluation criteria (e.g., every five minutes) that the user devices will implement to validate received content purported to be from the content provider.

At (2), the content validation service 110 configures the content validation management component 112. In some embodiments, the content validation management component 112 can configure the information utilized to validate visual secret requests, such as which identification information will be utilized. In other embodiments, the content validation management component 112 can configure the form of the visual secret information provided to user devices, timing or expiration information for the transmitted visual secret information, specific request selecting information, and the like. At (3), the content validation management component 112 can generate the content validation code that will be provided to the user devices 102. Illustratively, the content validation code can correspond to a single transmission provided by the content validation service 110 to the user devices. In other embodiments, the content validation service 110 can update the content validation code or transmit the content validation code repeatedly to the user devices.

Additionally, in some embodiments, at (3), the content validation service 110 can also generate the reference integrity information that may be utilized by the content validation service 110 or the user device 102 as will be described below. Illustratively, the reference integrity information may be based on initial content provided by the content provider 120 (e.g., HTML code) or processing content with requested resources. The content validation service 110 can utilize a service to generate the reference integrity information, such as a hash or checksum. Additionally, for reference integrity information related to processed content information, the content validation service 110 can access a service to generate the processed content for calculating the reference integrity information. For example, the service can utilize virtual machines to host different configurations of browser application, virtual devices, and other software to attempt to best match how different user device configuration will process content for rendering. The service may be able to provide an attempted best match to specified user devices 102 or can provide more generalized processed content (e.g., representative of small handheld devices, tablet devices, tablet devices or desktop devices). In some embodiments, the content provider 120 may provide some or all the integrity information as part of the meta-data included in the content validation request.

At (4), the content validation service 110 transmits the content validation code to the user device. Illustratively, the transmission may be responsive to a request, such as registration request or as part of handshaking protocol utilized to receive content from content providers. In other embodiments, the content validation service 110 can transmit the content validation code without a request based on identification of the user device (or network application) via another service. Additionally, the network application 216 of the user device 102 may be configured to generate requests for the validation code from the content validation service 110. At (5), the user device stores and configures the received content validation processing code for execution by the user device 102. In embodiments in which additional processing information, such as a library of reference integrity information is included as part of the transmission of the content validation processing code, the user device 102 can receive, process and store the additional processing information.

Figure 4B:
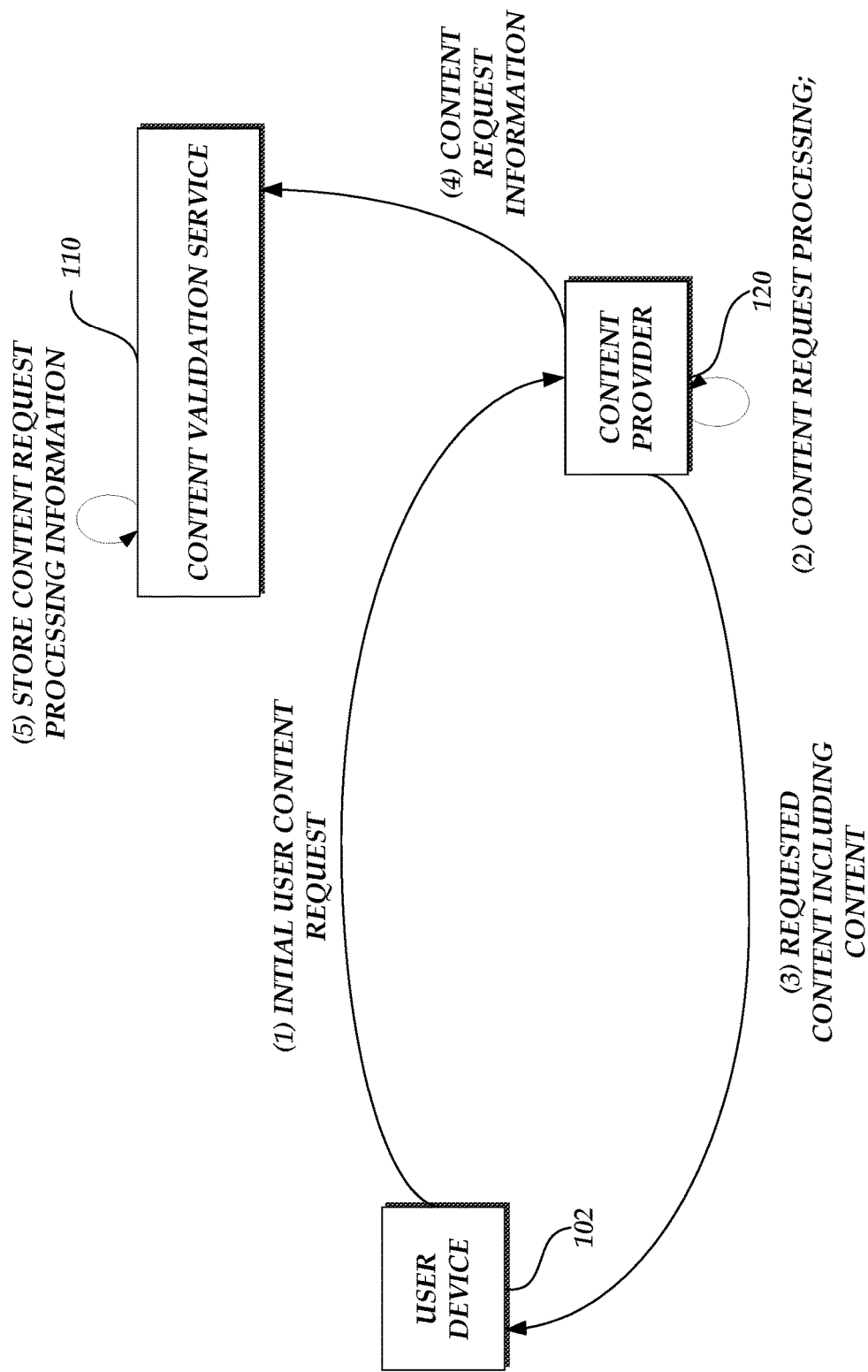

Turning now to FIG. 4B, at (1), the user device 102 transmits an initial request for content. Illustratively, a user can access one or more software applications on the user device to request content. For example, the user device can generate an interface for receiving user commands or interactions and transmit the request. Illustratively, the interaction with the user device 102 and the communication network 140 can leverage DNS routing to identify the IP address of a content provider 120 and subsequent transmissions of the content requests to the identified IP address, such as to a Web server. Other examples of routing or redirection may also be applied.

At (2), the content provider 120 processes the content request. Illustratively, the content provider 120 can obtain user identifiers, security information, or other information that will facilitate that customization of content for an identified user. For example, the user device 102 may transmit specific authentication and authorization information (e.g., a token) that is used by the content provider 120 to provide customized or personalized content in response to a request. In some embodiments, the content provider 120 can maintain some form of encryption or security protocol that facilitates the exchange of user identifiers or security information between the user devices 102 and the content provider 120.

In some embodiments, the content validation service 110 can obtain integrity information from the content provider 120 to allow the content validation service 110 to verify whether the entity requesting the content (e.g., the user device 102) is the same entity subsequently requesting the visual secret information. Illustratively, the content provider 120 can identify the entity in a variety of ways, including electronic tokens, software certificates, session identifiers, hardware profiles, software profiles, user identifiers, and the like. The identification information can include singular pieces of information or multiple pieces of information, such as a combination of the illustrative information identified previously.

At (3), the content provider 120 provides the user device an initial set of content corresponding to the request, such as HTML markup information corresponding to a Web page and identifying one or more embedded resources to be obtained by the network application.

At (4), the content validation service 110 obtains content request processing information from the content provider 120. As will be explained in greater detail below, the content request log information can include various information utilized by the content validation service 110 to determine content integrity. In one aspect, the content request log information can include identification information utilized to identify the user device 102 requesting content. The identification information can include, but is not limited to, user identifiers, device identifiers, browser identifiers, hardware profiles, software profiles, location information, network information, and the like. The identification information can also include specific credentials generated by the content provider 120 for use in later identifying the user device. In another aspect, the content request log information can include integrity information summarizing or quantifying the returned content to form the reference integrity information utilized by the content validation service 110 or user device 102 to validate the received content. Such information can include, but is not limited, to checksums, hashes, excerpts, snapshots, and the like. The content validation service 110 stores the information at (5).

Figure 4C:
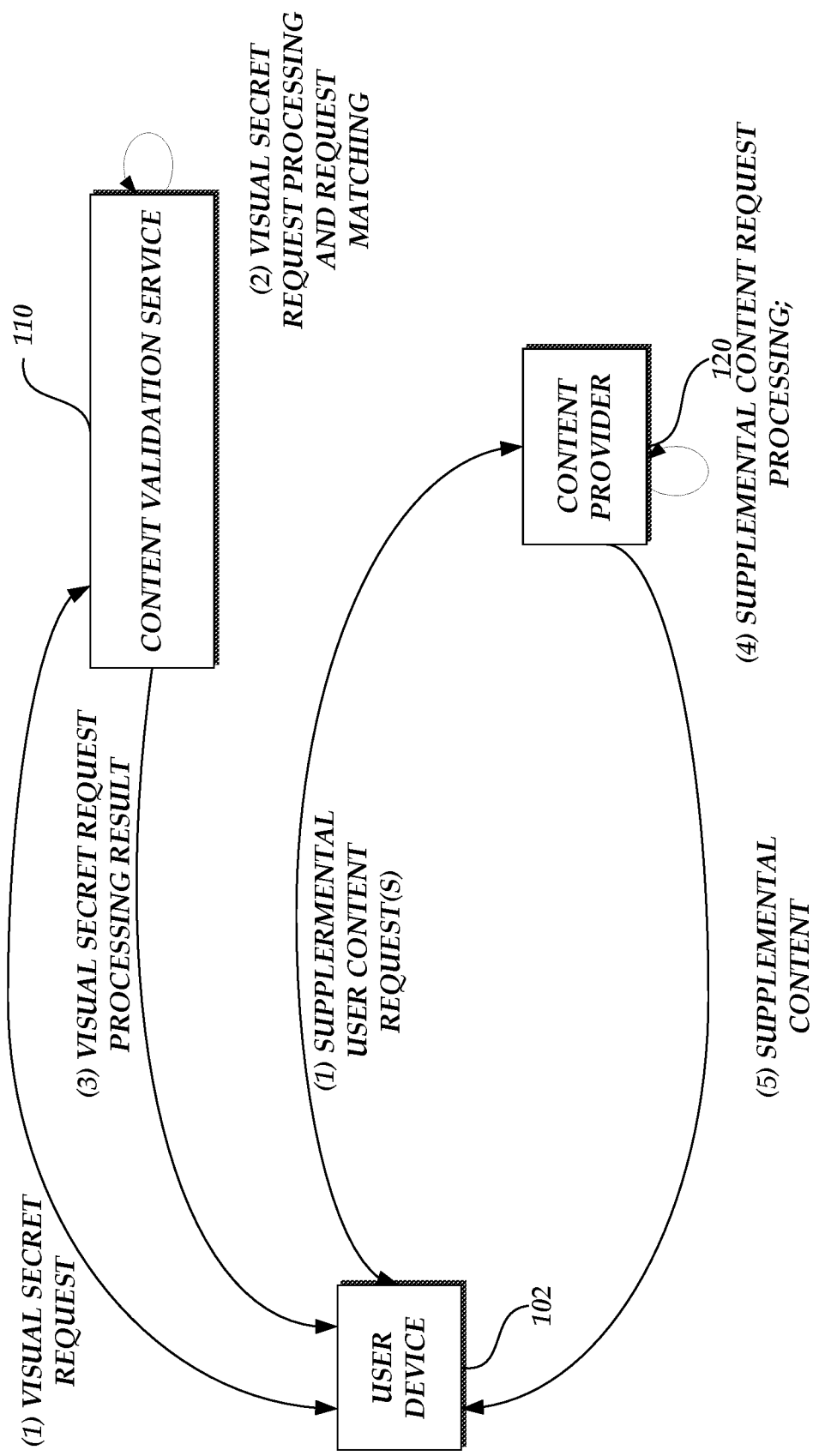

With reference to FIG. 4C, a first aspect for verifying the integrity of the received content will be described. At (1), the user device 102 processes the received content and can generate two transmissions. The first transmission corresponds to a traditional processing of initial content with embedded resource identifiers, such as embedded images or customized content, that results in the transmission of one or more supplemental content requests for updated content. The supplemental content requests can be transmitted to the content provider 102, proxies designated by the content provider, content delivery networks, or third-party service providers.

For the second transmission, the user device 102 executes the content validation processing code to transmit a request for visual secret information to the content validation service 110. Illustratively, the transmission of the both transmissions can be responsive to the processing of received content, based on commands included in the initial content or based on criteria determined by the user device 102. As will be discussed in greater detail below, the transmission of the visual secret request can include the transmission of integrity information for purposes of validating the content initial content received is not characterized as different from content originally provided by the content provider 120. The integrity information can include a copy of the initial content received from the content provider or a summary of the content, such as a hash or checksum.

As indicated above, in some embodiments, the content validation processing code can be configured to transmit the requests for visual secret information at different intervals or based on evaluation of criteria. For example, a content provider 120 may associate criteria or intervals based on an understanding of the content being accessed by the user device 102. In another example, a user can configure the network application or content validation processing code to utilize tags, meta-data, or keywords in the initial content request to determine whether visual secret information should be request. In still a further example, the initial content request can include criteria or commands that determine whether visual secret information processing should occur. The criteria may be specific to the initial content, attributes of the user device (e.g., network identification of a private network, or based on random selection). The configuration of the frequency or selection criteria may be configured utilizing alternative or increase security protocols such that manipulation of content cannot influence whether the content validation processing component initiates the validation of the content. Additionally, although both transmissions are illustrated as occurring substantially at the same time, in some embodiments, the transmission of the request for supplemental content and the transmission of the request for the visual secret information may be independently executed, including execution by different components. Similarly, both the illustrated transmissions can correspond to various networking and security protocols that can include additional information or multiple data exchanges.

At (2), the content validation service 110 processes the visual secret request. Additionally, in some embodiments, the content validation service 110 can attempt to match identification information associated with the visual secret request provided by the content validation component of the user device 102 corresponds to identification information associated with an original content request received from the content provider. Illustratively, the request for visual secret information includes various identification information related to the user device 102. As described previously, the identification information can include, but is not limited to, user identifiers, device identifiers, browser identifiers, hardware profiles, software profiles, location information, network information, credentials, certificates, and the like. As described above, the content validation service 110 attempts to match the request for visual secret information with the previously received request for content. With reference to the examples described above, in the event a third party requested content from the content provider 120, modified the content and then provides it to the user device 102, identity information associated with the original content request (e.g., the third party) would be different from identity information associated with the visual secret request (e.g., the user device).

For some types of information, such as user identifiers, credentials, certificates, the content validation service 110 can attempt to make perfect match with the previously stored information. For other types of information, such as hardware profiles, the content validation service 110 can accept partial matching or substantial similarity (with a defined percentage of tolerance). In this aspect, if the content validation service 110 makes a determination that the identification from the two requests do not match, the content validation service 110 can further make the characterization that a different entity requested the original content than the entity that is requesting the visual secret information (e.g., the user device 102). Such a characterization may be interpreted by the content validation service 110 as indicative of an event that cannot establish or guarantee the integrity of the content received by the user device 102.

As previously discussed, in some embodiments, the content validation service 110 can also attempt to verify whether the initial content has been manipulated or otherwise modified, such as by a "man in the middle" attack. In this aspect, if the user device 102 includes integrity information or a copy of the received initial content, the content validation service 110 can generate or utilize the integrity information to compare against reference integrity information provided by the content provider 120. For example, if the integrity information corresponds to hash, the content validation service 110 can compare the hash of the received integrity information with the hash of the reference integrity information to determine if they are identical. In this aspect, if the content validation service 110 makes a determination that the integrity information does not match, the content validation service 110 can further make the characterization that the initially received content has been modified since transmission of the initial content from the content provider 120. Such a characterization may be interpreted by the content validation service 110 as indicative of an event that cannot establish or guarantee the integrity of the content received by the user device 102.

In another embodiment, the user device 102 can determine whether the initial content has been manipulated or otherwise modified. In this embodiment, if the user device 102 does not necessarily provide integrity information or a copy of the received initial content with the visual secret request. However, the content validation service 110 generates or collects the reference integrity information and provides it to the content validation processing component of the user device 102. Accordingly, the content validation processing component can generate the integrity information for the locally received initial content and determine whether a match occurs from the reference integrity information provided by the content validation service 110. Such a determination may be further transmitted to the content validation service 110. In this aspect, if the user device 102 makes a determination that the integrity information does not match, the user device 102 can further make the characterization that the initially received content has been modified since transmission of the initial content from the content provider 120. Such a characterization may be interpreted by the user device and the content validation service 110 as indicative of an event that cannot establish or guarantee the integrity of the content received by the user device 102.

If the content validation service 110 is able to match (partially or entirely) the request such that the content validation service 110 can characterize that the same entity that requested the initial content from the content provider 120 is requesting the visual secret information or determines that the integrity information of the initial content request matches, the content validation service 110 can proceed with providing or generating visual secret information. The visual secret information can illustratively include a unique sequence of information that can be represented in rendered content, such as in a bar code, QR code, text, and the like. In other embodiments, the visual secret information can include information that can be interpreted from visual objects, such as font size, font colors, pixel colors, and the like. Additionally, the visual secret information can include expiration information or other processing information that influences how the visual secret information is rendered.

At (3), the content validation service 110 transmits the visual secret processing result to the user device 102. If the content validation service 110 has determined that a match did not occur, the visual secret processing result can be in the form of a notification or alert or command that can be provided directly or indirectly to the user device 102. For example, the content validation service 110 can cause a message to be displayed by the browser application on the user device 102 indicating that accessed content cannot be verified. In another example, the content validation service 110 can cause messages or command to be transmitted to a security software service to implement a possible security scan or audit of the content. In other examples, the content validation service 110 can transmit communication messages to the user, system administrators, security professionals, etc. indicative of the determination (positive or negative). If the content validation service 110 has determined that a match did occur, the visual secret processing result can be in the form of the generated visual secret information generated for the user device 102. Illustratively, the communication of the visual secret information or notifications, alerts, and commands may be accomplished in accordance with various networking protocols, including secure or encrypted transmission.

In addition to the processing of the visual secret request from the user device 102, the content provider 120 (or any additional third parties) can process the supplemental requests for content. Although illustrated in FIG. 4C as occurring after the processing of the visual secret information, the processing of the supplemental content requests can occur independent of the visual secret processing requests. At (4), the content provider 120 (and additional third-parties) process the supplemental content requests. As described above, the processing of the supplemental content requests can include the generation of customized content, such as recommendations, images, advertisements, and the like. In some embodiments, the supplemental content request transmission and processing may be omitted or modified. At (5), the content provider 120 (or third parties) transmits supplemental content to the user device 102 in one or more transmissions. The communication of the visual secret information or notifications, alerts, and commands may be accomplished in accordance with various networking protocols, including secure or encrypted transmission.

Figure 4D:
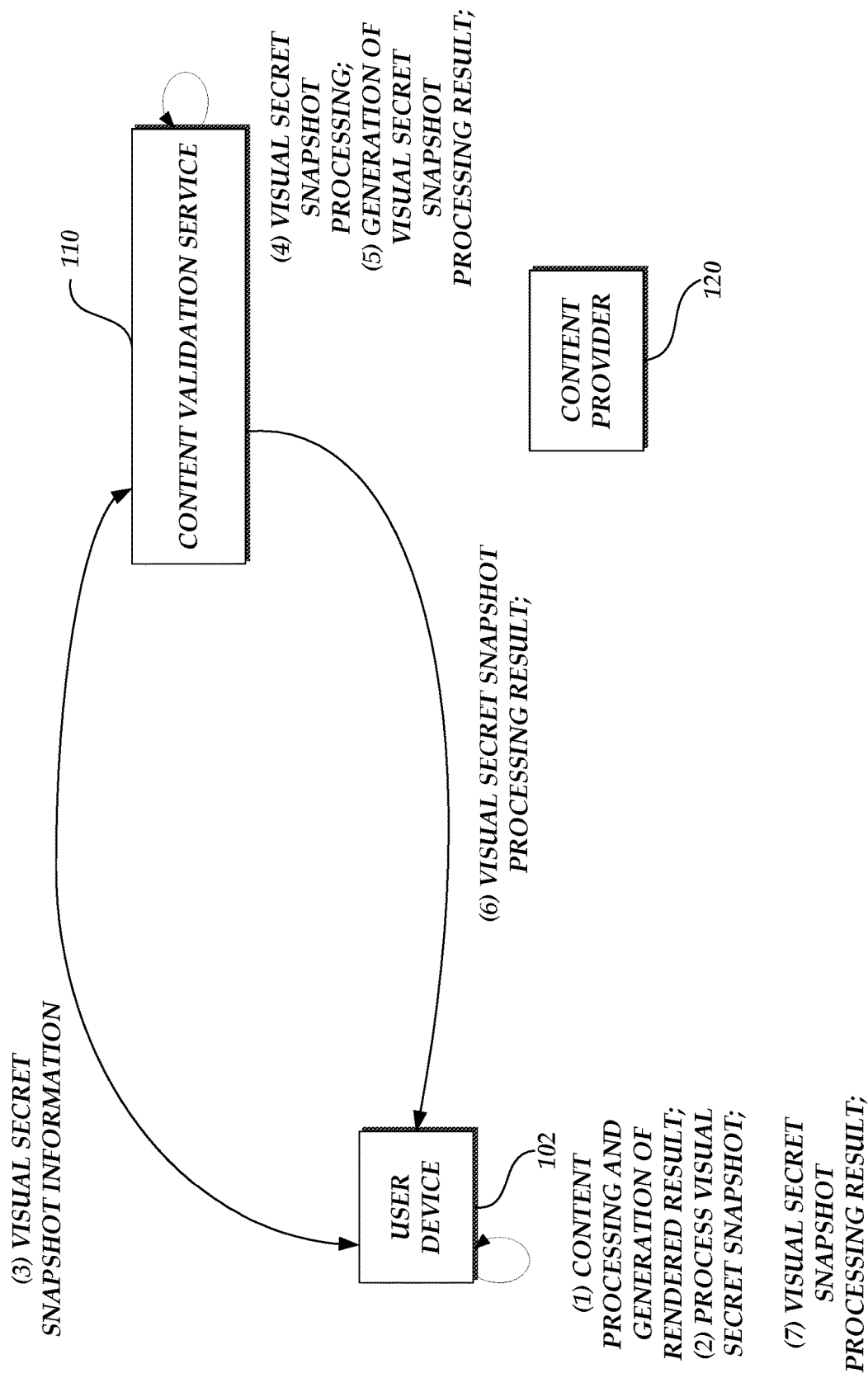

Turning now to FIG. 4D, a second aspect for verifying one or more aspects of the integrity of the received content will be described. After the initial and supplemental content has been received from the content provider 120 (and third parties) and the visual secret information has been received from the content validation service 110, at (1), the user device 102 processes the content for rendering a result for display on an interface associated with the user device 102. In one embodiment, the user device can render the initial content, supplemental content and visual secret information together. In other embodiments, the user device 102 can render the initial content and supplemental content separately from the visual secret information and combine the rendered portions. Additionally, depending on the type of visual secret information that is received and additional configurations of the user device, the user device 102 can process received visual secret information into a form that will be rendered on the user device. For example, the visual secret information, such as a unique identifier or code, may generated in a visual form by way of bar code, QR codes, font color, font size, pixel colors, pixel grouping and the like.

Accordingly, the user device can utilize configuration information to map the unique identifier or code into a representation for display. Including in this processing is the selection of the form of visual representation based on selection criteria, such as time of day, content provider, user device and the like. Still further, the user device 102 can utilize configuration information to map the location of the unique identifier or code into a representation for display. Including in this processing is the selection of the form of visual representation based on selection criteria, such as time of day, content provider, user device and the like. The user device 102 can utilize the same or different criteria for selection the form of representation and the location of the representation. For example, a user device 102 may vary the type of visual representation and location each time the visual secret information is accessed. Illustratively, the user device 102 can process the data for rendering without causing a display to be rendered. For example, the user device 102 can cause information to be provided to a display buffer or cache for display but prior to actual display. In another example, the user device can capture the information generated for rendering but prior to display and information generated after display (e.g., to determine whether the content is modified during the rendering process).

At (2), the user device 102 processes a visual secret snapshot. Illustratively, the user device 102 captures an image of the combined rendered image to be generated or generated on the user device. Illustratively, the user device 102 captures at least a portion of the total generated display that will include the represented visual secret information or at least a portion of the represented visual secret information. The user device 102 does not necessarily have to capture the entire screen display to generated or capture the full representation of the visual secret information.

At (3), the user device 102 transmits the visual secret snapshot information to the content validation service 110. In a manner described above, the user device 102 can also include additional integrity information, such as checksum information and hash information regarding the rendered content (including or excluding the visual secret information). In this aspect, the content validation service 110 can attempt a second time (or first time) to verify whether the fully processed content has been manipulated or otherwise modified, such as by a "man in the middle" attack during the retrieval of additional resources. In this aspect, if the user device 102 includes integrity information or a copy of the fully processed content, the content validation service 110 can generate or utilize the integrity information to compare against reference integrity information provided by the content provider 120. For example, if the integrity information corresponds to checksum information, the content validation service 110 can compare the checksums of the received integrity information with the hash of the reference integrity information to determine if they are identical. In this aspect, if the content validation service 110 makes a determination that the integrity information does not match, the content validation service 110 can further make the characterization that the initially received content has been modified since transmission of the initial content from the content provider 120. Such a characterization may be interpreted by the content validation service 110 as indicative of an event that cannot establish or guarantee the integrity of the content received by the user device 102.

In another embodiment, the user device 102 can determine whether the initial content has been manipulated or otherwise modified. In this embodiment, if the user device 102 does not necessarily provide integrity information or a copy of the received initial content with the visual secret request. However, the content validation service 110 generates or collects the reference integrity information and provides it to the content validation processing component of the user device 102. Accordingly, the content validation processing component can generate the integrity information for the locally received initial content and determine whether a match occurs from the reference integrity information provided by the content validation service 110. Such a determination may be further transmitted to the content validation service 110. In this aspect, if the user device 102 makes a determination that the integrity information does not match, the user device 102 can further make the characterization that the initially received content has been modified since transmission of the initial content from the content provider 120. Such a characterization may be interpreted by the user device and the content validation service 110 as indicative of an event that cannot establish or guarantee the integrity of the content received by the user device 102. As described above, in this aspect, for reference integrity information related to processed content information, the content validation service 110 can access a service to generate the processed content for calculating the reference integrity information. For example, the service can utilize virtual machines to host different configurations of browser application, virtual devices, and other software to attempt to best match how different user device configuration will process content for rendering. The service may be able to provide an attempted best match to specified user devices 102 or can provide more generalized processed content (e.g., representative of small handheld devices, tablet devices, tablet devices or desktop devices). In some embodiments, the content provider 120 may provide some or all the integrity information as part of the meta-data included in the content validation request. [0057] At (4), the content validation service 110, processes the received visual secret snapshot information and any integrity information. Illustratively, the content validation service 110 can utilize a number of visual processing techniques, including extrapolation, image correction, image adjustment, and the like to enhance or modify the submitted visual secret information to identify representations of the visual secret information. In some embodiments, the content validation service 110 can utilize baseline or templates for comparison of the rendered visual secret information. The content validation service 110 can then process the representation of the visual secret information to identify a unique code or information from the representation.

In one embodiment, the content validation service 110 can validate the representation of the visual secret information and the code represented by the visual secret information. In one aspect, the content validation service 110 can validate that the location and type of visual secret information is valid in view of the selection criteria. In another aspect, the content validation service 110 can validate that the integrity information, such as hash or checksums, are also valid and are not indicative of additional, modified or alternative information in the rendered images. In still another aspect, the content validation service 110 can validate that the visual secret information at least partially matches the visual secret information provided to the user device as described above with regard to FIG. 4C.

At (5), the content validation service 110 generates a visual secret snapshot processing result. If the content validation service 110 has determined that the visual secret snapshot information and extracted visual secret information is not valid, the visual secret processing result can be in the form of a notification or alert or command that can be provided directly or indirectly to the user device 102. For example, the content validation service 110 can cause a message to be displayed by the browser application on the user device 102 indicating that accessed content cannot be verified. In another example, the content validation service 110 can cause messages or command to be transmitted to a security software service to implement a possible security scan or audit of the content. In other examples, the content validation service 110 can transmit communication messages to the user, system administrators, security professionals, etc. indicative of the determination (positive or negative). If the content validation service 110 has determined that the visual secret snapshot information and extracted visual secret information is not valid, the visual secret processing result can be in the form of the generated visual secret information generated for the user device 102. Illustratively, the communication of the visual secret information or notifications, alerts, and commands may be accomplished in accordance with various networking protocols, including secure or encrypted transmission.

At (6), the content validation service 110 transmits the visual snapshot processing result to the user device 102. At (7), the user device processes the visual snapshot processing result by displaying relevant information (e.g., notifications or warning), generating additional notifications, or modifying the operation of the network interface application.

Figure 5:
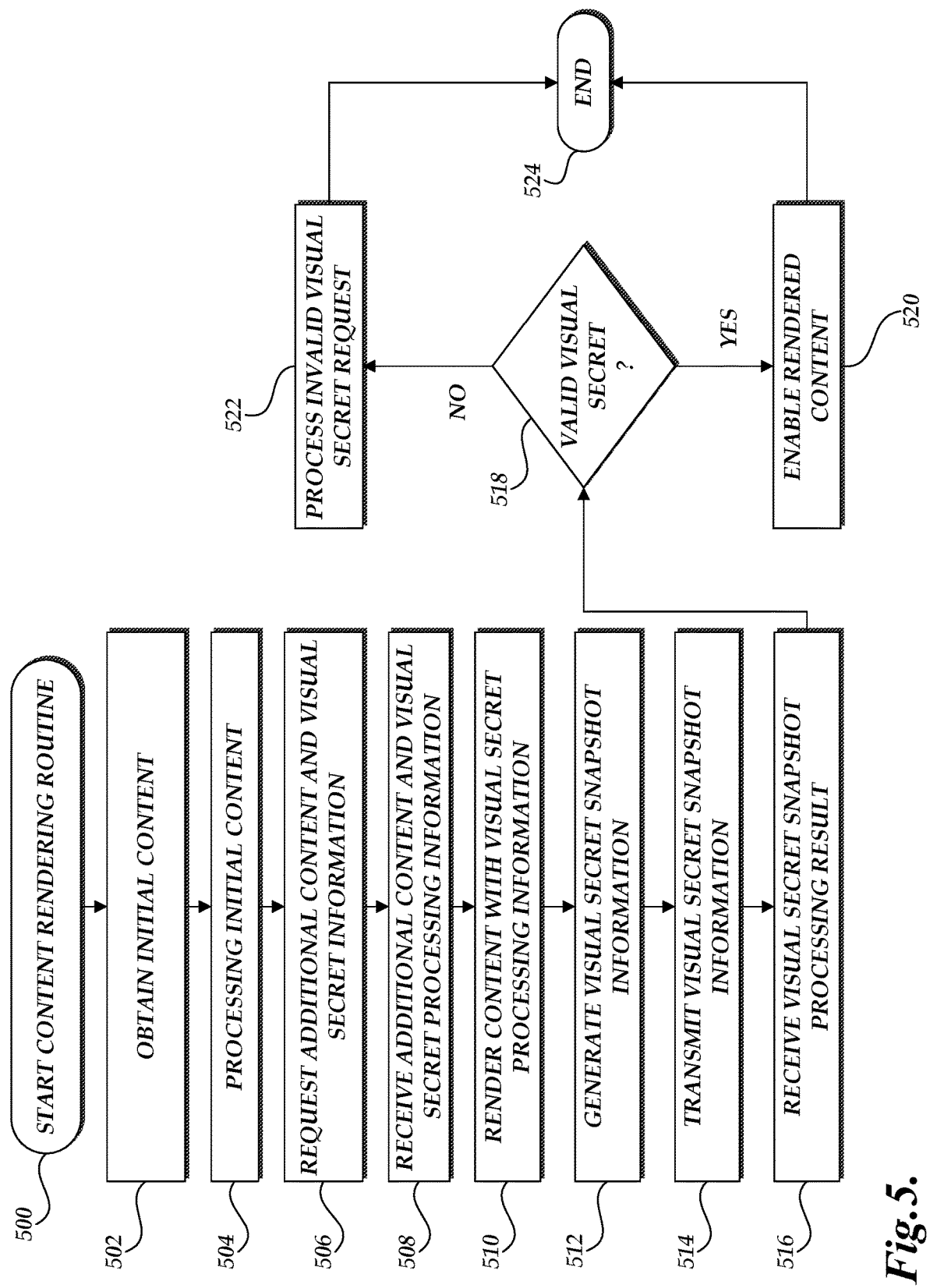
FIG. 5 is a flow diagram illustrative of a content processing routine implemented by a user device.

Turning now to FIG. 5, a routine 500 illustrating a content rendering routine implemented by the user device 102 will be described. Routine 500 begins after the user device 102 transmits an initial request for content (FIG. 4B). Illustratively, a user can access one or more software applications on the user device to request content. For example, the user device can generate an interface for receiving user commands or interactions and transmit the request. Illustratively, the interaction with the user device 102 and the communication network 140 can leverage DNS routing to identify the IP address of a content provider 120 and subsequent transmissions of the content requests to the identified IP address, such as to a Web server. Other examples of routing or redirection may also be applied.

As described above, in situations in which a third party has not assumed the identity of the content provider (e.g., by hosting a common misspelling of a content provider domain or intercepting a request), the content provider 120 processes the content request. Illustratively, the content provider 120 can obtain user identifiers, security information, or other information that will facilitate that customization of content for an identified user. For example, the user device 102 may transmit specific authentication and authorization information (e.g., a token) that is used by the content provider 120 to provide customized or personalized content in response to a request. In some embodiments, the content provider 120 can maintain some form of encryption or security protocol that facilitates the exchange of user identifiers or security information between the user devices 102 and the content provider 120.

Additionally, as described above, the content validation service 110 can obtain information from the content provider 120 to allow the content validation service 110 to verify whether the entity requesting the content (e.g., the user device 102) is the same entity subsequently requesting the visual secret information. Illustratively, the content provider 120 can identify the entity in a variety of ways, including electronic tokens, software certificates, session identifiers, hardware profiles, software profiles, user identifiers, and the like. The identification information can include singular pieces of information or multiple pieces of information, such as a combination of the illustrative information identified previously. The content validation service 110 can also receive integrity information that can be utilized by the content validation service or the user device to characterize whether the received content has been modified or altered relative to a version of the content generated by the content provider (e.g., such as in a man in the middle style technique).

At block 502, the user device receives an initial set of content corresponding to the request, such as HTML markup information corresponding to a Web page and identifying one or more embedded resources to be obtained by the network application. At block 504, the user device 102 processes the received content and can generate two transmissions at block 506. The first transmission corresponds to a traditional processing of initial content with embedded resource identifiers, such as embedded images or customized content, that results in the transmission of one or more supplemental content requests for updated content. The supplemental content requests can be transmitted to the content provider 102, proxies designated by the content provider, content delivery networks, or third-party service providers. Additionally, the user device 102 will also execute the content validation code to transmit a request for visual secret information to the content validation service 110. Illustratively, the transmission of the visual secret request can include the transmission of integrity information for purposes of validating the content initial content received is not characterized as different from content originally provided by the content provider 120. The integrity information can include a copy of the initial content received from the content provider or a summary of the content, such as a hash or checksum.

As described above, the transmission of the both transmissions can be responsive to the processing of received content, based on commands included in the initial content or based on criteria determined by the user device 102. Additionally, although both transmissions are illustrated as occurring substantially at the same time, in some embodiments, the transmission of the request for supplemental content and the transmission of the request for the visual secret information may be independently executed, including execution by different components. In some embodiments, the content validation processing code can be configured to transmit the requests for visual secret information at different intervals or based on evaluation of criteria. For example, a content provider 120 may associate criteria or intervals based on an understanding of the content being accessed by the user device 102. In another example, a user can configure the network application or content validation processing code to utilize tags, meta-data, or keywords in the initial content request to determine whether visual secret information should be request. In still a further example, the initial content request can include criteria or commands that determine whether visual secret information processing should occur. The criteria may be specific to the initial content, attributes of the user device (e.g., network identification of a private network, or based on random selection). The configuration of the frequency or selection criteria may be configured utilizing alternative or increase security protocols such that manipulation of content cannot influence whether the content validation processing component initiates the validation of the content.

As described above, the content validation service 110 processes the visual secret request. Illustratively, the request for visual secret information includes various identification information related to the user device 102. As described previously, the identification information can include, but is not limited to, user identifiers, device identifiers, browser identifiers, hardware profiles, software profiles, location information, network information, credentials, certificates, and the like. As described above, the content validation service 110 attempts to match the request for visual secret information with the previously received request for content. For some types of information, such as user identifiers, credentials, certificates, the content validation service 110 can attempt to make perfect match with the previously stored information. For other types of information, such as hardware profiles, the content validation service 110 can accept partial matching or substantial similarity (with a defined percentage of tolerance).

As previously discussed, in some embodiments, the content validation service 110 can also attempt to verify whether the initial content has been manipulated or otherwise modified, such as by a "man in the middle" attack. In this aspect, if the user device 102 includes integrity information or a copy of the received initial content, the content validation service 110 can generate or utilize the integrity information to compare against reference integrity information provided by the content provider 120. For example, if the integrity information corresponds to hash, the content validation service 110 can compare the hash of the received integrity information with the hash of the reference integrity information to determine if they are identical. In this aspect, if the content validation service 110 makes a determination that the integrity information does not match, the content validation service 110 can further make the characterization that the initially received content has been modified since transmission of the initial content from the content provider 120. Such a characterization may be interpreted by the content validation service 110 as indicative of an event that cannot establish or guarantee the integrity of the content received by the user device 102.

As described above, in other embodiments, the user device 102 can determine whether the initial content has been manipulated or otherwise modified. In this embodiment, if the user device 102 does not necessarily provide integrity information or a copy of the received initial content with the visual secret request. Rather, the user device 102 may include a request for reference integrity information or otherwise indicate that the user device will process the reference integrity information.

At block 508, if the content validation service 110 makes a determination that the identification from the two requests do not match or that the integrity information provided by the user device 102 does not match reference integrity information, the content validation service 110 can further make the characterization that a different entity requested the original content than the entity that is requesting the visual secret information (e.g., the user device 102). Such a characterization may be interpreted by the content validation service 110 as indicative of an event that cannot establish or guarantee the integrity of the content received by the user device 102. Alternatively, at block 508, if the content validation service 110 is able to match (partially or entirely) the request such that the content validation service 110 can characterize that the same entity that requested the initial content from the content provider 120 is requesting the visual secret information, the content validation service 110 can proceed with providing or generating visual secret information. The visual secret information can illustratively include a unique sequence of information that can be represented in rendered content, such as in a bar code, QR code, text, and the like. In other embodiments, the visual secret information can include information that can be interpreted from visual objects, such as font size, font colors, pixel colors, and the like.

With continued reference to block 508, if the content validation service 110 has determined that a match did not occur, the visual secret processing result can be in the form of a notification or alert or command that can be provided directly or indirectly to the user device 102. For example, the content validation service 110 can cause a message to be displayed by the browser application on the user device 102 indicating that accessed content cannot be verified. In another example, the content validation service 110 can cause messages or command to be transmitted to a security software service to implement a possible security scan or audit of the content. In other examples, the content validation service 110 can transmit communication messages to the user, system administrators, security professionals, etc. indicative of the determination (positive or negative). If the content validation service 110 has determined that a match did occur, the visual secret processing result can be in the form of the generated visual secret information generated for the user device 102. Illustratively, the communication of the visual secret information or notifications, alerts, and commands may be accomplished in accordance with various networking protocols, including secure or encrypted transmission.

In still further embodiments, if the user device 102 requests or otherwise indicates that the integrity information will be matched by the user device, the content validation processing component 110 can generate the integrity information for the locally received initial content and determine whether a match occurs from the reference integrity information provided by the content validation service 110. Such a determination may be further transmitted to the content validation service 110. In this aspect, if the user device 102 makes a determination that the integrity information does not match, the user device 102 can further make the characterization that the initially received content has been modified since transmission of the initial content from the content provider 120. Such a characterization may be interpreted by the user device and the content validation service 110 as indicative of an event that cannot establish or guarantee the integrity of the content received by the user device 102.

At block 510, after the initial and supplemental content has been received from the content provider 120 (and third parties) and the visual secret information has been received from the content validation service 110, the user device 102 processes the content for rendering a result for display on an interface associated with the user device 102. In one embodiment, the user device can render the initial content, supplemental content and visual secret information together. In other embodiments, the user device 102 can render the initial content and supplemental content separately from the visual secret information and combine the rendered portions. Additionally, depending on the type of visual secret information that is received and additional configurations of the user device, the user device 102 can process received visual secret information into a form that will be rendered on the user device. For example, the visual secret information, such as a unique identifier or code, may generated in a visual form by way of bar code, QR codes, font color, font size, pixel colors, pixel grouping and the like. Accordingly, the user device can utilize configuration information to map the unique identifier or code into a representation for display. Including in this processing is the selection of the form of visual representation based on selection criteria, such as time of day, content provider, user device and the like. Still further, the user device 102 can utilize configuration information to map the location of the unique identifier or code into a representation for display. Including in this processing is the selection of the form of visual representation based on selection criteria, such as time of day, content provider, user device and the like. The user device 102 can utilize the same or different criteria for selection the form of representation and the location of the representation. For example, a user device 102 may vary the type of visual representation and location each time the visual secret information is accessed.

At block 512, the user device 102 processes a visual secret snapshot. Illustratively, the user device 102 captures an image of the combined rendered image to be generated or generated on the user device. Illustratively, the user device 102 captures at least a portion of the total generated display that will include the represented visual secret information or at least a portion of the represented visual secret information. The user device 102 does not necessarily have to capture the entire screen display to generated or capture the full representation of the visual secret information. Illustratively, the user device 102 can process the data for rendering without causing a display to be rendered. For example, the user device 102 can cause information to be provided to a display buffer or cache for display but prior to actual display. In another example, the user device can capture the information generated for rendering but prior to display and information generated after display (e.g., to determine whether the content is modified during the rendering process).

At block 514, the user device 102 transmits the visual secret snapshot information to the content validation service 110. In some embodiments, the user device 102 can also include additional identification integrity information, such as checksum information and hash information regarding the rendered image (including or excluding the visual secret information). In this aspect, the content validation service 110 can attempt a second time (or first time) to verify whether the fully processed content has been manipulated or otherwise modified, such as by a "man in the middle" attack during the retrieval of additional resources.

As described above, the content validation service 110 processes the received visual secret snapshot information. Illustratively, the content validation service 110 can utilize a number of visual processing techniques, including extrapolation, image correction, image adjustment, and the like to enhance or modify the submitted visual secret information to identify representations of the visual secret information. In some embodiments, the content validation service 110 can utilize baseline or templates for comparison of the rendered visual secret information. The content validation service 110 can then process the representation of the visual secret information to identify a unique code or information from the representation. Based on the processing, the content validation service 110 generates a visual secret snapshot processing result.

In this aspect, if the user device 102 includes integrity information or a copy of the fully processed content, the content validation service 110 can generate or utilize the integrity information to compare against reference integrity information provided by the content provider 120. For example, if the integrity information corresponds to checksum information, the content validation service 110 can compare the checksums of the received integrity information with the hash of the reference integrity information to determine if they are identical. In this aspect, if the content validation service 110 makes a determination that the integrity information does not match, the content validation service 110 can further make the characterization that the initially received content has been modified since transmission of the initial content from the content provider 120. Such a characterization may be interpreted by the content validation service 110 as indicative of an event that cannot establish or guarantee the integrity of the content received by the user device 102.

At block 516, the user device receives the visual secret snapshot processing result. As described above, the visual secret snapshot processing result can include information indicative of the characterization of the visual secret snapshot process by the content validation service 100. Still further, the visual secret snapshot processing result can include information indicative of the characterization of a comparison of integrity information by the content validation service 110. Even further, the visual secret snapshot processing result can include instructions or commands that facilitate additional processing of the characterization by the user device 102, such as enabling or disabling functionality, generating warnings, and the like. Still further, in some embodiments, the visual secret snapshot processing result can include reference integrity information if the user device 102 will be conducting integrity information matching.

At decision block 518, a test is conducted to determine if the visual secret snapshot processing result is indicative of a valid visual secret or valid integrity information. Decision block 518 can also be utilized for the user device 102 to compare generated integrity information with reference integrity information. If the content validation service 110 has determined that the visual secret snapshot information and extracted visual secret information or that the integrity information provided by the user device 102 is not valid, at block 522, the visual secret processing result can be in the form of a notification or alert or command that can be provided directly or indirectly to the user device 102. For example, the content validation service 110 can cause a message to be displayed by the browser application on the user device 102 indicating that accessed content cannot be verified. In another example, the content validation service 110 can cause messages or command to be transmitted to a security software service to implement a possible security scan or audit of the content. In other examples, the content validation service 110 can transmit communication messages to the user, system administrators, security professionals, etc. indicative of the determination (positive or negative).

Alternatively, if the content validation service 110 determines that the visual secret snapshot information and extracted visual secret information is valid, at block 520, the visual secret processing result can be in the form of a command or instructions that enables the display or continued display of the rendered content. Additionally, the user device 102 can generate visual indicators such as an icon, text, or colors that indicate the content has been verified or passed an integrity test. Illustratively, the communication of the visual secret information or notifications, alerts, and commands may be accomplished in accordance with various networking protocols, including secure or encrypted transmission. At block 524, the routine 500 terminates and routine 500 can finish or begin another iteration.

Figure 6:
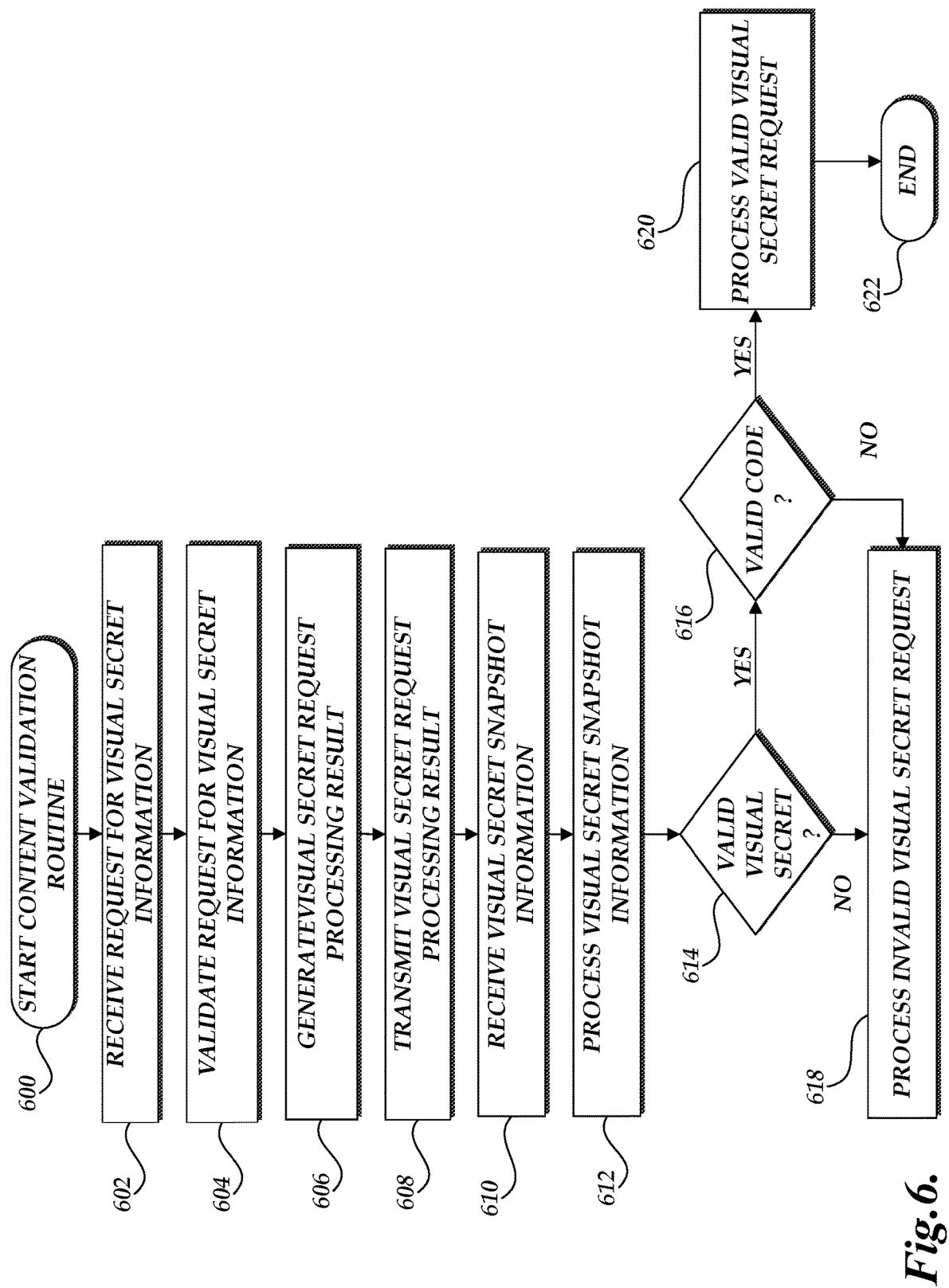
FIG. 6 is a flow diagram illustrative of a content processing routine implemented by a content validation service.

Turning now to FIG. 6, a routine 600 illustrating a content validation routine implemented by the content validation service 110 will be described. Similar to routine 500, routine 600 begins after the user device 102 transmits an initial request for content from a content provider 120. Illustratively, a user can access one or more software applications on the user device to request content. For example, the user device can generate an interface for receiving user commands or interactions and transmit the request. Illustratively, the interaction with the user device 102 and the communication network 140 can leverage DNS routing to identify the IP address of a content provider 120 and subsequent transmissions of the content requests to the identified IP address, such as to a Web server. Other examples of routing or redirection may also be applied.

As also described above, the content provider 120 processes the content request. Illustratively, the content provider 120 can obtain user identifiers, security information, or other information that will facilitate that customization of content for an identified user. For example, the user device 102 may transmit specific authentication and authorization information (e.g., a token) that is used by the content provider 120 to provide customized or personalized content in response to a request. In some embodiments, the content provider 120 can maintain some form of encryption or security protocol that facilitates the exchange of user identifiers or security information between the user devices 102 and the content provider 120.

In some embodiments, the content validation service 110 can obtain information from the content provider 120 to allow the content validation service 110 to verify whether the entity requesting the content (e.g., the user device 102) is the same entity subsequently requesting the visual secret information. Illustratively, the content provider 120 can identify the entity in a variety of ways, including electronic tokens, software certificates, session identifiers, hardware profiles, software profiles, user identifiers, and the like. The identification information can include singular pieces of information or multiple pieces of information, such as a combination of the illustrative information identified previously. The user device receives an initial set of content corresponding to the request, such as HTML markup information corresponding to a Web page and identifying one or more embedded resources to be obtained by the network application.

As described above, the user device 102 processes the received content and can generate two transmissions. The first transmission corresponds to a traditional processing of initial content with embedded resource identifiers, such as embedded images or customized content, that results in the transmission of one or more supplemental content requests for updated content. The supplemental content requests can be transmitted to the content provider 102, proxies designated by the content provider, content delivery networks, or third-party service providers. Additionally, the user device 102 will also execute the content validation code to transmit a request for visual secret information to the content validation service 110. Illustratively, the transmission of the both transmissions can be responsive to the processing of received content, based on commands included in the initial content or based on criteria determined by the user device 102. Additionally, although both transmissions are illustrated as occurring substantially at the same time, in some embodiments, the transmission of the request for supplemental content and the transmission of the request for the visual secret information may be independently executed, including execution by different components.

At block 602, the content validation service 110 receives the visual secret request from the user device 102. Illustratively, the request for visual secret information includes various identification information related to the user device 102. As described previously, the identification information can include, but is not limited to, user identifiers, device identifiers, browser identifiers, hardware profiles, software profiles, location information, network information, credentials, certificates, and the like. As described above, the content validation service 110 attempts to match the request for visual secret information with the previously received request for content. For some types of information, such as user identifiers, credentials, certificates, the content validation service 110 can attempt to make perfect match with the previously stored information. For other types of information, such as hardware profiles, the content validation service 110 can accept partial matching or substantial similarity (with a defined percentage of tolerance).

Accordingly, at block 604, the content validation service 110 makes a determination whether the identification from the two requests match and generates a processing result at block 606. If the information from the requests do not match, the content validation service 110 can further make the characterization that a different entity requested the original content than the entity that is requesting the visual secret information (e.g., the user device 102). Such a characterization may be interpreted by the content validation service 110 as indicative of an event that cannot establish or guarantee the integrity of the content received by the user device 102. Alternatively, at block 604, if the content validation service 110 is able to match (partially or entirely) the request such that the content validation service 110 can characterize that the same entity that requested the initial content from the content provider 120 is requesting the visual secret information, the content validation service 110 can proceed with generating visual secret information at block 606. The visual secret information can illustratively include a unique sequence of information that can be represented in rendered content, such as in a bar code, QR code, text, and the like. In other embodiments, the visual secret information can include information that can be interpreted from visual objects, such as font size, font colors, pixel colors, and the like.

With continued reference to block 604, if the content validation service 110 has determined that a match did not occur, the visual secret processing result at block 606 can be in the form of a notification or alert or command that can be provided directly or indirectly to the user device 102. For example, the content validation service 110 can cause a message to be displayed by the browser application on the user device 102 indicating that accessed content cannot be verified. In another example, the content validation service 110 can cause messages or command to be transmitted to a security software service to implement a possible security scan or audit of the content. In other examples, the content validation service 110 can transmit communication messages to the user, system administrators, security professionals, etc. indicative of the determination (positive or negative). If the content validation service 110 has determined that a match did occur, the visual secret processing result can be in the form of the generated visual secret information generated for the user device 102. Illustratively, the communication of the visual secret information or notifications, alerts, and commands may be accomplished in accordance with various networking protocols, including secure or encrypted transmission. At block 606, the content validation service 110 transmits visual secret request processing results based on the determination described above. At block 608, the content validation service 110 transmits the visual secret process result to the use device 102.

As described above, after the initial and supplemental content has been received from the content provider 120 (and third parties) and the visual secret information has been received from the content validation service 110, the user device 102 processes the content for rendering a result for display on an interface associated with the user device 102. In one embodiment, the user device can render the initial content, supplemental content and visual secret information together. In other embodiments, the user device 102 can render the initial content and supplemental content separately from the visual secret information and combine the rendered portions. Additionally, depending on the type of visual secret information that is received and additional configurations of the user device, the user device 102 can process received visual secret information into a form that will be rendered on the user device. For example, the visual secret information, such as a unique identifier or code, may generated in a visual form by way of bar code, QR codes, font color, font size, pixel colors, pixel grouping and the like. Accordingly, the user device can utilize configuration information to map the unique identifier or code into a representation for display. Including in this processing is the selection of the form of visual representation based on selection criteria, such as time of day, content provider, user device and the like. Still further, the user device 102 can utilize configuration information to map the location of the unique identifier or code into a representation for display. Including in this processing is the selection of the form of visual representation based on selection criteria, such as time of day, content provider, user device and the like. The user device 102 can utilize the same or different criteria for selection the form of representation and the location of the representation. For example, a user device 102 may vary the type of visual representation and location each time the visual secret information is accessed. Additionally, the user device 102 processes a visual secret snapshot and transmit the visual secret snapshot to the content validation service 110.

Illustratively, the user device 102 captures an image of the combined rendered image to be generated or generated on the user device. Illustratively, the user device 102 captures at least a portion of the total generated display that will include the represented visual secret information or at least a portion of the represented visual secret information. The user device 102 does not necessarily have to capture the entire screen display to generated or capture the full representation of the visual secret information. At block 514, the user device 102 transmits the visual secret snapshot information to the content validation service 110. In some embodiments, the user device 102 can also include additional identification information, such as checksum information and hash information regarding the rendered image (including or excluding the visual secret information).

At block 610, the content validation service 110 receives the visual secret information and processes the received visual secret snapshot information at block 612. Illustratively, the content validation service 110 can utilize a number of visual processing techniques, including extrapolation, image correction, image adjustment, and the like to enhance or modify the submitted visual secret information to identify representations of the visual secret information. In some embodiments, the content validation service 110 can utilize baseline or templates for comparison of the rendered visual secret information. The content validation service 110 can then process the representation of the visual secret information to identify a unique code or information from the representation. Based on the processing, the content validation service 110 generates a visual secret snapshot processing result.

At decision block 614, a test is conducted to determine if the visual secret snapshot processing result is indicative of a valid visual secret. In one embodiment, the content validation service 110 can validate the representation of the visual secret information and the code represented by the visual secret information. In one aspect, the content validation service 110 can validate that the location and type of visual secret information is valid in view of the selection criteria. In another aspect, the content validation service 110 can validate that the content integrity information, such as hash or checksums, are also valid and are not indicative of additional, modified or alternative information in the rendered images. If not, the routine 600 proceeds to block 618 to process an invalid visual secret snapshot information. At decision block 614, a test is conducted to determine if the visual secret snapshot processing result is indicative that the extracted visual secret information is valid. In still another aspect, the content validation service 110 can validate that the visual secret information at least partially matches the visual secret information provided to the user device If not, the routine 600 proceeds to block 618 to process an invalid visual secret snapshot information.

Illustratively, the visual secret processing result can be in the form of a notification or alert or command that can be provided directly or indirectly to the user device 102. For example, the content validation service 110 can cause a message to be displayed by the browser application on the user device 102 indicating that accessed content cannot be verified. In another example, the content validation service 110 can cause messages or command to be transmitted to a security software service to implement a possible security scan or audit of the content. In other examples, the content validation service 110 can transmit communication messages to the user, system administrators, security professionals, etc. indicative of the determination (positive or negative). Alternatively, if the content validation service 110 has determined that the visual secret snapshot information and extracted visual secret information is not valid, at block 620, the visual secret processing result can be in the form of the generated visual secret information generated for the user device 102. Illustratively, the communication of the visual secret information or notifications, alerts, and commands may be accomplished in accordance with various networking protocols, including secure or encrypted transmission. At block 622, the routine 600 terminates and routine 600 can finish or begin another iteration.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system to manage the delivery of content, the system comprising:
one or more computing devices including a processor and a memory associated with a content validation service, wherein the content validation service is configured to:
receive a request for visual secret information from a browser application on a user device, the request for visual secret information transmitted responsive to received third-party content at the browser application;
validate the request for visual secret information based on identification information included in the request for visual secret information;
generate visual secret information responsive to the validation of the request for visual secret information, to be used for verifying integrity of the third party content;
transmit the generated visual secret information to the user device, wherein visual secret information received at the user device will be rendered into a rendered image in conjunction with the received third-party content by the user device;
cause the user device to generate a snapshot of the rendered image that includes the visual secret information received at the user device;
receive the snapshot of the rendered image that includes the visual secret information received at the user device from the user device;
receive from the user device integrity information including checksum information or hashtag information that is generated from the received third party content;
validate the snapshot of the rendered image that includes the visual secret information received at the user device by identifying the visual secret information represented in visual form and comparing the identified visual secret information with the visual secret information provided to the user device;
validate the received integrity information by comparing the received integrity information with reference integrity information that is generated from an intended version of the third-party content; and
transmit a processing result responsive to the validation of the snapshot of the rendered image that includes the visual secret information received at the user device and responsive to the validation of the received integrity information, the processing result identifying the integrity of the received third-party content.

2. The system of claim 1, wherein the content validation service validates the request for visual secret information by matching the identification information included in the visual secret request with identification information associated with a request for content received by a content provider.

3. The system of claim 1, wherein the visual secret information includes a unique code.

4. The system of claim 1, wherein the received content integrity information comprises calculated content integrity information that is calculated by the user device.

5. A computer-implemented method to manage content requests comprising:
receiving a request for visual secret information from a user device;
validating the request for visual secret information based on identification information included in the request;
generating visual secret information responsive to the validation of the request for visual secret information, to be used for verifying integrity of third-party content;
transmitting the generated visual secret information to the user device;
causing the user device to obtain integrity information comprising checksum information or hashtag information calculated from content received at the user device;
causing the user device to generate a snapshot of a rendered image that includes the visual secret information received at the user device;
receiving from the user device, the snapshot of the rendered image that includes the visual secret information received at the user device and the content integrity information that includes the checksum information or the hashtag information;
validating the received content integrity information and the snapshot of the rendered image that includes the visual secret information received at the user device by identifying the visual secret information represented in visual form and comparing the identified visual secret information with the visual secret information provided to the user device; and
generating a processing result responsive to the validations of the received content integrity information and the snapshot of the rendered image that includes the visual secret information received at the user device, the processing result identifying the integrity of the third-party content.

6. The computer-implemented method of claim 5, wherein the request for visual secret information includes a first client identifier associated with the user device.

7. The computer-implemented method of claim 6, wherein validating the request for visual secret information based on the identification information includes matching the first client identifier with a reference client identifier associated with an original content request.

8. The computer-implemented method of claim 5, wherein receiving the request for visual secret information from the user device includes receiving the content integrity information associated with content received by the user device.

9. The computer-implemented method of claim 8, wherein validating the request for visual secret information based on the identification information includes comparing the received content integrity information associated with content received by the user device with reference content integrity information provided by a content provider.

10. The computer-implemented method of claim 5, wherein the received visual secret information includes a unique credential.

11. The computer-implemented method of claim 5, wherein the received snapshot of the rendered image includes a representation of a QR code corresponding to the visual secret information.

12. The computer-implemented method of claim 5, wherein the received snapshot of the rendered image includes a representation associated with at least one visual object corresponding to the visual secret information.

13. The computer-implemented method of claim 12, wherein the representation associated with at least one visual object corresponding to the visual secret information includes at least one of a dimension, color, font, or location representative of the visual secret information.

14. The computer-implemented method of claim 12, wherein the representation associated with at least one visual object corresponding to the visual secret includes a plurality of visual representations of the visual secret information.

15. The computer-implemented method of claim 5 further comprising transmitting the content integrity information for validation by the user device.

16. The computer-implemented method of claim 5 further comprising transmitting a processing result corresponding to the validations of the identification information, the snapshot of the rendered image including the visual secret information, and the received content integrity information.

17. A computer-implemented method to manage content comprising:
    receiving a first request from a user device related to content integrity of received content;
    validating the first request based on identification information included in the first request;
    generating display information, responsive to the validation of the first request to be used for verifying the content integrity of the received content;
    causing the user device to obtain integrity information comprising checksum information or hashtag information calculated from the received content and to generate a visual image of a rendered combination of the received content and display information received at the user device;
    receiving, from the user device, the integrity information comprising the checksum information or the hashtag information related to the received content;
    receiving, from the user device, the visual image of the rendered combination that includes the display information received at the user device;
    validating the received integrity information and the visual image of the rendered combination that includes the display information received at the user device by identifying the visual secret information represented in visual form and comparing the identified visual secret information with the visual secret information provided to the user device; and
    generating a processing result responsive to the validations of the received integrity information and the visual image of the rendered combination that includes the display information received at the user device, the processing result identifying the content integrity of the received content.

18. The computer-implemented method of claim 16, wherein validating the first request based on the identification information included in the first request includes matching the identification information with identification information included in a content request.

19. The computer-implemented method of claim 16, wherein the integrity information comprises checksum information or hashtag information calculated from the received content.

20. The computer-implemented method of claim 18, wherein generating the processing result responsive to the validations of the received integrity information and the snapshot of the rendered image including the display information includes generating the processing result responsive to the validations of the received integrity information, the snapshot of the rendered image including the display information, and the identification information.

* * * * *